US011887152B2

(12) United States Patent
Guo et al.

(10) Patent No.: US 11,887,152 B2
(45) Date of Patent: *Jan. 30, 2024

(54) WEBPAGE ZONE EXPOSURE RATE OPTIMIZATION

(71) Applicant: Content Square SAS, Paris (FR)

(72) Inventors: Antoine Guo, Paris (FR); Stephen Lemaistre, Paris (FR); Sylvain Cousquer, Paris (FR)

(73) Assignee: Content Square SAS, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,230

(22) Filed: May 2, 2023

(65) Prior Publication Data

US 2023/0351437 A1 Nov. 2, 2023

Related U.S. Application Data

(63) Continuation of application No. 17/730,708, filed on Apr. 27, 2022, now Pat. No. 11,676,173.

(51) Int. Cl.
*G06Q 30/00* (2023.01)
*G06Q 30/0242* (2023.01)
(Continued)

(52) U.S. Cl.
CPC ......... *G06Q 30/0244* (2013.01); *G06F 9/451* (2018.02); *G06F 16/9577* (2019.01); *G06Q 30/0277* (2013.01)

(58) Field of Classification Search
None
See application file for complete search history.

(56) References Cited

U.S. PATENT DOCUMENTS 7,383,320 B1   6/2008  Silberstein et al.
7,979,877 B2 * 7/2011  Huber .................... G06Q 40/04
                                                        725/35
(Continued)

FOREIGN PATENT DOCUMENTS

KR      100845210 B1 *  7/2008  ......... G06Q 30/0243
KR      100845210 B1    7/2008
(Continued)

OTHER PUBLICATIONS

Epic Games. "Auto Exposure (Eye Adaptation)." (Jun. 5, 2018). Retrieved online Aug. 11, 2022. https://docs.unrealengine.com/4.27/en-US/RenderingAndGraphics/PostProcessEffects/AutomaticExposure/ (Year: 2018).*
(Continued)

*Primary Examiner* — James A Reagan
(74) *Attorney, Agent, or Firm* — Schwegman Lundberg & Woessner, P.A.

(57) ABSTRACT

Methods, systems, and programs are presented for determining exposure rate. One method includes an operation for operation for receiving a request, from a client device, for a value of an exposure rate of a zone within a webpage, the request comprising at least one search parameter and information about a viewport of the presented webpage. A check is made to determine if the exposure rate has been previously calculated. When the exposure rate has not been previously calculated, a visibility height of the zone is calculated and stored in a memory. When the exposure rate has been calculated, the visibility height is retrieved from the memory. Recordings of members accessing the webpage are analyzed to determine when the visibility height of the zone is visible in member devices accessing the webpage. The exposure rate of the zone is calculated based on the determinations of visibility of the zone.

20 Claims, 13 Drawing Sheets

(51) Int. Cl.
*G06Q 30/0241* (2023.01)
*G06F 9/451* (2018.01)
*G06F 16/957* (2019.01)

(56) References Cited

U.S. PATENT DOCUMENTS

| | | | |
|---|---|---|---|
| 8,375,304 B2* | 2/2013 | Swenson | G06F 16/957 |
| | | | 715/744 |
| 9,330,191 B2 | 5/2016 | Teevan et al. | |
| 9,767,479 B2* | 9/2017 | Filev | G06Q 30/02 |
| 9,898,528 B2 | 2/2018 | Kesin | |
| 10,015,226 B2 | 7/2018 | Scoda et al. | |
| 10,133,710 B2 | 11/2018 | Katic | |
| 10,248,628 B2* | 4/2019 | Hassan | G06F 16/9577 |
| 10,460,357 B1* | 10/2019 | Bevacqua | G06Q 30/0277 |
| 10,567,327 B2 | 2/2020 | Garg et al. | |
| 10,650,073 B1* | 5/2020 | Manzi | H04L 67/02 |
| 10,740,788 B2* | 8/2020 | Filev | G06Q 30/0277 |
| 10,816,993 B1* | 10/2020 | Tran | G05D 1/0088 |
| 10,854,198 B2* | 12/2020 | Bhaya | G06F 16/3329 |
| 10,922,724 B2* | 2/2021 | Yavonditte | G06Q 30/0272 |
| 10,928,830 B1* | 2/2021 | Tran | G05D 1/0088 |
| 10,955,855 B1* | 3/2021 | Tran | G05D 1/0246 |
| 10,957,002 B2* | 3/2021 | Chatterjee | G06Q 90/00 |
| 10,965,966 B1* | 3/2021 | Wu | H04L 65/80 |
| 10,977,690 B2* | 4/2021 | Narayan | G06F 16/27 |
| 11,062,360 B1* | 7/2021 | Donamukkala | G06N 20/00 |
| 11,080,754 B1* | 8/2021 | Han | G06Q 30/0201 |
| 11,341,315 B2* | 5/2022 | Nanavati | G06F 40/14 |
| 11,366,871 B2* | 6/2022 | Trigalo | G06N 5/04 |
| 11,386,473 B2* | 7/2022 | D'Souza | G06Q 30/0643 |
| 11,410,202 B2* | 8/2022 | Yavonditte | G06Q 30/0242 |
| 2007/0094244 A1 | 4/2007 | Wolfe | |
| 2011/0035263 A1* | 2/2011 | Ramanathan | G06Q 30/02 |
| | | | 705/14.4 |
| 2011/0208596 A1* | 8/2011 | Kwon | G06Q 30/08 |
| | | | 705/14.71 |
| 2011/0246286 A1* | 10/2011 | Cetin | G06Q 30/0243 |
| | | | 707/723 |
| 2012/0054143 A1* | 3/2012 | Doig | G06Q 30/0243 |
| | | | 706/47 |
| 2013/0019159 A1 | 1/2013 | Civelli et al. | |
| 2013/0066725 A1* | 3/2013 | Umeda | G06Q 30/0275 |
| | | | 705/14.66 |
| 2013/0151332 A1* | 6/2013 | Yan | G06Q 30/0243 |
| | | | 705/14.42 |
| 2014/0278981 A1* | 9/2014 | Mersov | G06Q 30/0255 |
| | | | 705/14.53 |
| 2015/0012811 A1 | 1/2015 | Chan et al. | |
| 2016/0342681 A1 | 11/2016 | Kesin | |
| 2017/0019489 A1 | 1/2017 | Churchill | |
| 2017/0140421 A1* | 5/2017 | Filev | G06Q 30/02 |
| 2017/0293936 A1* | 10/2017 | Filev | G06Q 30/0247 |
| 2019/0057104 A1* | 2/2019 | Hassan | G06F 11/3692 |
| 2019/0087867 A1* | 3/2019 | Yavonditte | G06Q 30/0242 |
| 2020/0013089 A1* | 1/2020 | Narayan | G06F 16/27 |
| 2020/0250259 A1* | 8/2020 | Nanavati | G06F 3/0484 |
| 2020/0265467 A1* | 8/2020 | Gupta | G06K 9/6223 |
| 2020/0387554 A1* | 12/2020 | Hajdara | G06F 16/9577 |
| 2021/0012387 A1* | 1/2021 | Yavonditte | G06Q 30/0242 |
| 2021/0034687 A1* | 2/2021 | Achan | G06F 16/9024 |
| 2021/0125251 A1* | 4/2021 | D'Souza | G06Q 30/0244 |
| 2021/0157330 A1* | 5/2021 | Tran | G06N 3/0454 |
| 2021/0192576 A1* | 6/2021 | Narayan | G06F 16/27 |
| 2021/0224856 A1* | 7/2021 | Lu | G06Q 30/0244 |
| 2021/0271258 A1* | 9/2021 | Tran | G01C 21/34 |
| 2021/0365962 A1* | 11/2021 | Tolentino | G06N 20/00 |
| 2022/0043879 A1 | 2/2022 | Trigalo et al. | |

FOREIGN PATENT DOCUMENTS

| | | | | |
|---|---|---|---|---|
| WO | WO-2007136221 A1 * | 11/2007 | | G06Q 20/06 |
| WO | WO-2007136221 A1 | 11/2007 | | |
| WO | WO-2018228285 A1 * | 12/2018 | | G06F 11/3082 |
| WO | WO-2018228285 A1 | 12/2018 | | |

OTHER PUBLICATIONS

Adobe. "Modifying and using views." (Jan. 18, 2022). Retrieved online Aug. 11, 2022. https://helpx.adobe.com/after-effects/using/modifying-using-views.html (Year: 2022).*

Surma. "IntersectionObserver's coming into view." (Oct. 3, 2017). Retrieved online Aug. 11, 2022. https://developer.chrome.com/blog/intersectionobserver/ (Year: 2017).*

"U.S. Appl. No. 16/986,572, Final Office Action dated Jan. 12, 2022", 19 pgs.

"U.S. Appl. No. 16/986,572, Non Final Office Action dated Aug. 27, 2021", 18 pgs.

"U.S. Appl. No. 16/986,572, Notice of Allowance dated May 11, 2022", 6 pgs.

"U.S. Appl. No. 16/986,572, Response filed Apr. 12, 2022 to Final Office Action dated Jan. 12, 2022", 10 pgs.

"U.S. Appl. No. 16/986,572, Response filed Nov. 29, 2021 to Non Final Office Action dated Aug. 27, 2021", 11 pgs.

"U.S. Appl. No. 17/730,708, Examiner Interview Summary dated Dec. 23, 2022", 3 pgs.

"U.S. Appl. No. 17/730,708, Final Office Action dated Nov. 25, 2022", 20 pgs.

"U.S. Appl. No. 17/730,708, Non Final Office Action dated Aug. 16, 2022". 16 pgs.

"U.S. Appl. No. 17/730,708, Notice of Allowance dated Feb. 3, 2023", 14 pgs.

"U.S. Appl. No. 17/730,708, Response filed Jan. 18, 2023 to Final Office Action dated Nov. 25, 2022", 9 pgs.

"U.S. Appl. No. 17/730,708, Response filed Nov. 16, 2022 to Non Final Office Action dated Aug. 16, 2022", 16 pgs.

"Auto Exposure (Eye Adaptation)", Epic Games, [Online] Retrieved from the Internet: <URL: https://docs.unrealengine.com/4.27/en-US/RenderingAndGraphics/PostProcessEffects/AutomaticExposure/>, (2018), 39 pgs.

Surma, "IntersectionObserver's coming into view", web.dev, [Online] Retrieved from the Internet: < URL: https://developer.chrome.com/blog/intersectionobserver/>, (2017), 11 pgs.

"Modifying and using views", Adobe, [Online] Revrieved from the Internet: <URL: https://helpx.adobe.com/after-effects/using/modifying-using-views.html>, (2022), 13 pgs.

\* cited by examiner

LAYOUT IS THE SAME BUT DISTANCES ARE DIFFERENT
FOR DIFFERENT DISPLAY SIZES

LAYOUT CHANGES BASED ON DISPLAY SIZE

WEBPAGE ZONE EXPOSURE RATE OPTIMIZATION

CROSS-REFERENCE TO RELATED APPLICATIONS

This application is a Continuation Application under 35 USC § 120 of U.S. patent application Ser. No. 17/730,708, entitled "Webpage Zone Exposure Rate Optimization," filed on Apr. 27, 2022, and is herein incorporated by reference in its entirety.

TECHNICAL FIELD

The subject matter disclosed herein generally relates to methods, systems, and machine-readable storage media for measuring website performance.

BACKGROUND

As computer systems and networks continue to present new opportunities for individuals and organizations, website operators, owners, and administrators may seek to better understand the performance of various websites and webpages. Due to the open-ended nature of web design, quantifying website performance may prove difficult, such as when webpages include one or more dynamic elements. Further, while established performance goals may provide insight into overall webpage performance, systems for discretizing performance to understand the contribution of each element of a website remain inaccessible.

BRIEF DESCRIPTION OF THE DRAWINGS

Various of the appended drawings merely illustrate example embodiments of the present disclosure and cannot be considered as limiting its scope.

DETAILED DESCRIPTION

Example methods, systems, and computer programs are directed to determining the exposure rate consistently for multiple users. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

One popular website performance metric for administrators is the exposure rate of a zone within a webpage when people access the webpage. The exposure rate is the number of webpage views that include presentation of at least a part of the zone divided by the total number of webpage views. However, the layout of the webpage may vary due to several factors, such as the size of the display where the website is presented. Due to this variability, the location of the zone may change, so calculating the exposure rate may result in different values based on the layout used for the calculation. In one aspect, the first time the exposure rate is requested by a client for a certain time period, the location of the zone is calculated for the client's device, and the location is stored in memory. The exposure rate is then calculated with the calculated zone location. Future requests for the exposure rate will use the stored value of the zone location, resulting in consistent results when the exposure rate is presented in the client device.

One general aspect includes a method that includes an operation for receiving a request, from a client device, for a value of an exposure rate of a zone within a webpage, the request comprising at least one search parameter and information about a viewport of the webpage presented in the client device. Further, the method includes checking to determine if the exposure rate has been previously calculated for the at least one search parameter. When the exposure rate has not been previously calculated, the method includes operations for calculating a visibility height of the zone based on the viewport, and storing the visibility height in a memory. When the exposure rate has been calculated, the visibility height is retrieved from the memory. The method further includes an operation for analyzing a plurality of recordings of members accessing the webpage to determine when the visibility height of the zone is visible in member devices accessing the webpage. The exposure rate of the zone is calculated based on the determination of visibility of the zone for the plurality of recordings. Further, the method includes causing presentation of the exposure rate on a user interface (UI).

Figure 1:
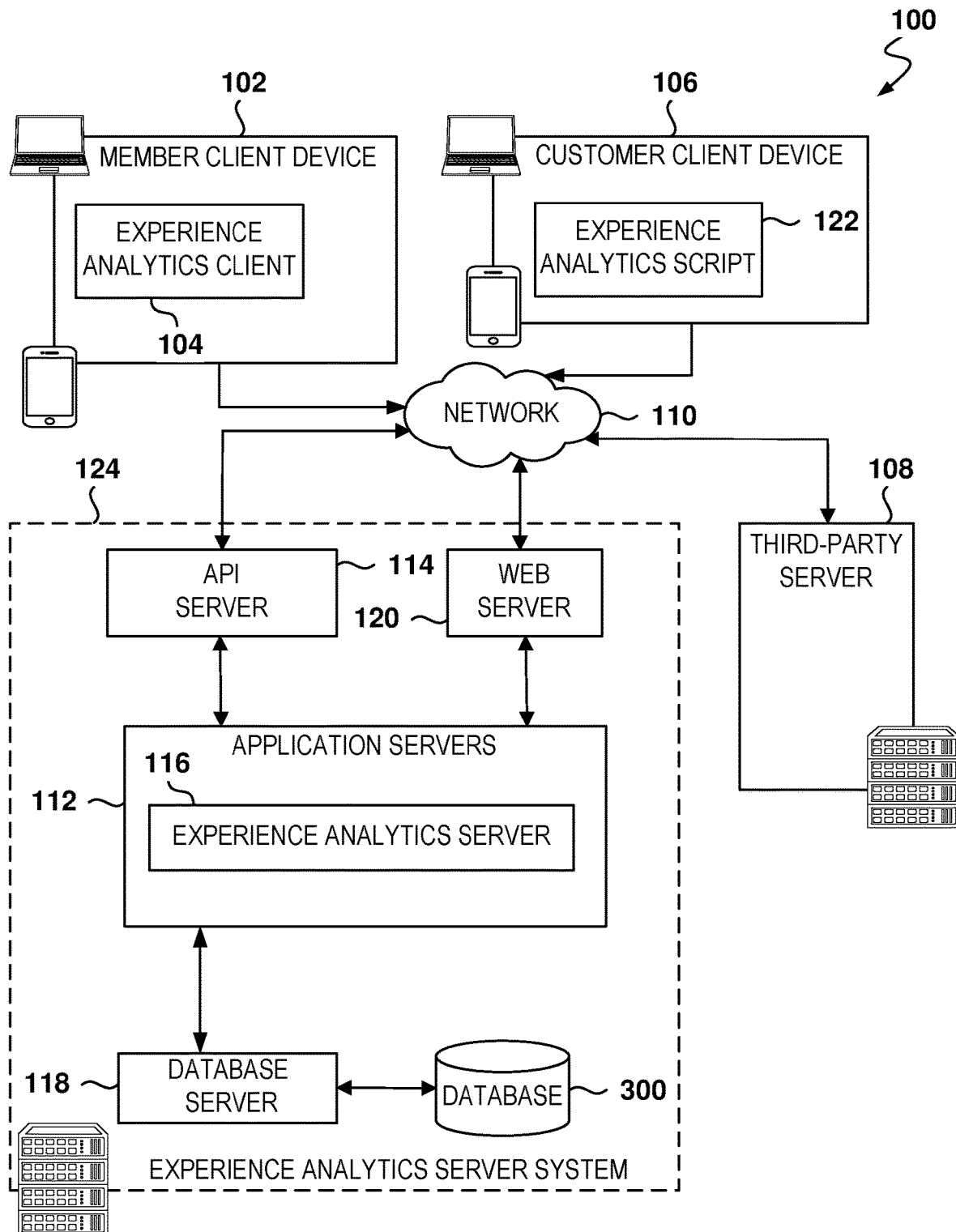
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 106, and multiple instances of a third-party server 108.

The member client device 102 is associated with a client of the experience analytics system 100, where the client that has a website hosted on the client's third-party server 108. For example, the client can be a retail store that has an online retail website that is hosted on a third-party server 108. An agent of the client (e.g., a web administrator, an employee, etc.) can be the user of the member client device 102.

Each of the member client devices 102 hosts one or more applications, including an experience analytics client 104. Each experience analytics client 104 is communicatively coupled with an experience analytics server system 124 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications (e.g., Chrome, Safari, etc.). The experience analytics client 104 can also be implemented as a platform that is accessed by the member client device 102 via an Internet browsing application or implemented as an extension on the Internet browsing application.

Users of the customer client device 106 can access clients' websites that are hosted on the third-party servers 108 via the network 110 using the Internet browsing applications. For example, the users of the customer client device 106 can navigate to a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a ".*js" file or a ".json" file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server system 124. The SDK includes APIs with functions that can be called or invoked by the client's native application.

In one example, the experience analytics script 122 records data including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 122 transmits the data to experience analytics server system 124 via the network 110. In another example, the experience analytics script 122 transmits the data to the third-party server 108 and the data can be transmitted from the third-party server 108 to the experience analytics server system 124 via the network 110.

An experience analytics client 104 is able to communicate and exchange data with the experience analytics server system 124 via the network 110. The data exchanged between the experience analytics client 104 and the experience analytics server system 124 includes functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server system 124 supports various services and operations that are provided to the experience analytics client 104. Such operations include transmitting data to and receiving data from the experience analytics client 104. Data exchanges to and from the experience analytics server system 124 are invoked and controlled through functions available via user interfaces (UIs) of the experience analytics client 104.

The experience analytics server system 124 provides server-side functionality via the network 110 to a particular experience analytics client 104. While certain functions of the experience analytics system 100 are described herein as being performed by either an experience analytics client 104 or by the experience analytics server system 124, the location of certain functionality either within the experience analytics client 104 or the experience analytics server system 124 may be a design choice. For example, it may be technically preferable to initially deploy certain technology and functionality within the experience analytics server system 124 but to later migrate this technology and functionality to the experience analytics client 104 where a member client device 102 has sufficient processing capacity.

Turning now specifically to the experience analytics server system 124, an API server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112 and provides web-based interfaces to the application servers 112. To this end, the web server 120 processes incoming network requests over the Hypertext Transfer Protocol (HTTP) and several other related protocols.

The API server 114 receives and transmits message data (e.g., commands and message payloads) between the member client device 102 and the application servers 112. Specifically, the API server 114 provides a set of interfaces (e.g., routines and protocols) that can be called or queried by the experience analytics client 104 or the experience analytics script 122 in order to invoke functionality of the application servers 112. The API server 114 exposes to the experience analytics client 104 various functions supported by the application servers 112, including generating information on errors, insights, merchandising information, adaptability information, images, graphs providing visualizations of experience analytics, session replay videos, zoning and overlays to be applied on the website, etc.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 122 on customer client devices 106. The experience analytics server 116 implements processing technologies and functions related to generating user interfaces including information on errors, insights, merchandising information, adaptability information, images, graphs providing visualizations of experience analytics, session replay videos, zoning, and overlays to be applied on the website, etc. Other processor and memory intensive processing of data may also be performed server-side by the experience analytics server 116, in view of the hardware requirements for such processing.

Figure 2:
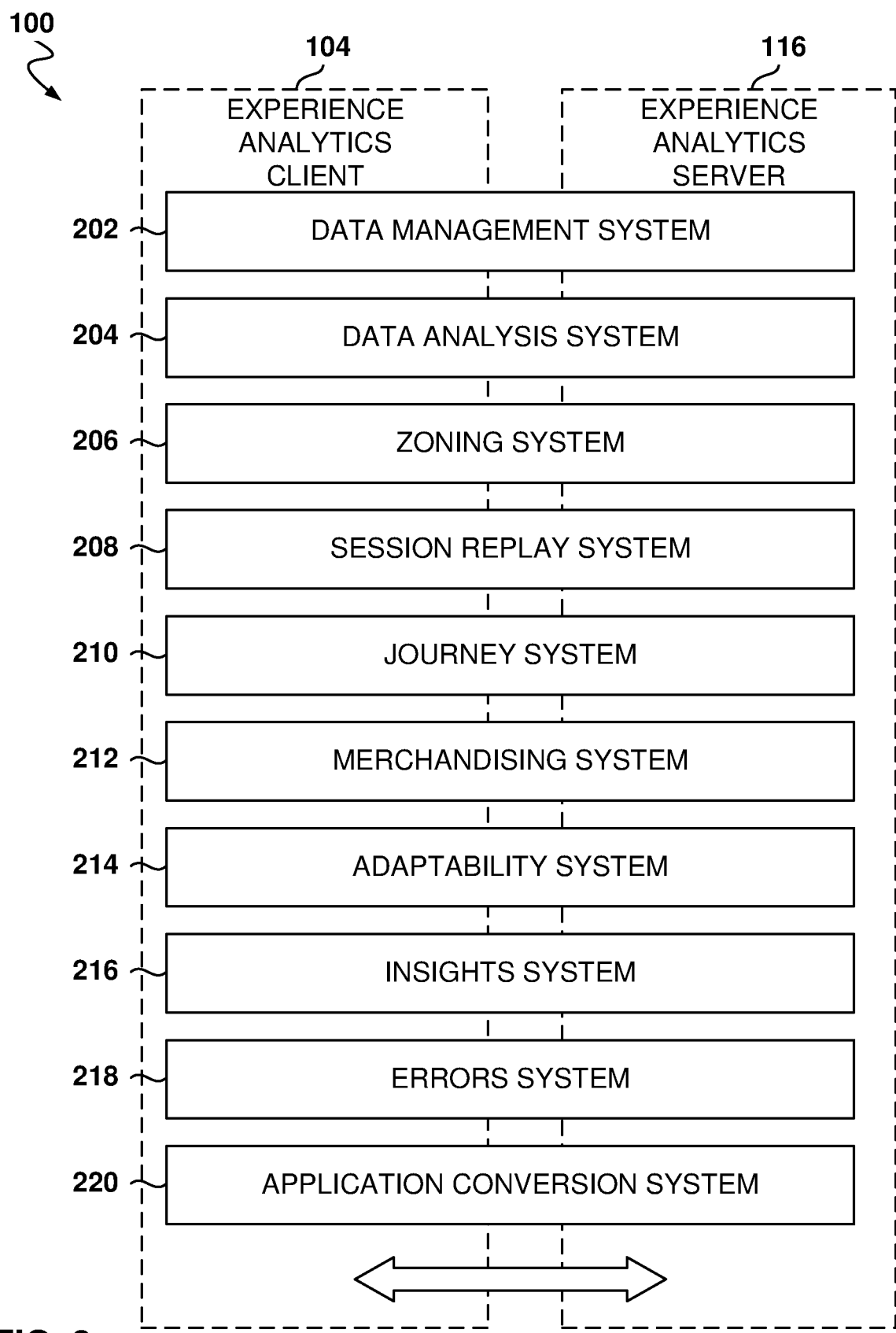
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual visitor session on the client's website. For example, a user visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversion, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website and illustrates the visited pages and in order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on the following: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 106 for users that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 122 to determine whether an accessibility-enhanced version of the client's website is needed, and can generate the accessibility-enhanced version of the client's website to be displayed by the customer client device 106.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 104 on a dashboard of a user interface, as a pop-up element, as a separate panel, etc. In this example, the insights system 216 is responsible for generating an insights interface to be displayed by the member client device 102 via the experience analytics client 104. In another example, the insights can be incorporated in another interface such as the zoning interface, the session replay, the journey interface, or the merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that adversely affects (e.g., causes frustration for) the users (e.g., users on customer client devices 106 visiting the client's website). The errors can also include causes of looping behaviors by the users, in-page issues such as unresponsive calls to action and slow loading pages, etc. The errors can be displayed by the member client devices 102 via the experience analytics client 104 on a dashboard of a user interface, as a pop-up element, as a separate panel, etc. In this example, the errors system 218 is responsible for generating an errors interface to be displayed by the member client device 102 via the experience analytics client 104. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 104. The application conversion system 220 generates an accessibility-enhanced version of the client's mobile application to be displayed by the customer client devices 106.

In some embodiments, the data analysis system 204 uses session replay information of the session replay system 208 to determine multiple states of a webpage. Further, the data analysis system 204 provides utilities for analyzing the multiple stages. Once the user selects one of the states, the insights system 216 provides information about the state, such as the actions on the webpage (e.g., click on a pull-down menu) that generated the state and information about the state (e.g., statistics on the use of the webpage.

In one aspect, the data analysis system 204 provides an option for defining scroll levels to determine when a page is considered for generating insights, such as the percentage of the webpage to scroll down (e.g., viewed) by the user to consider the page when calculating view statistics and other metrics.

Figure 3:
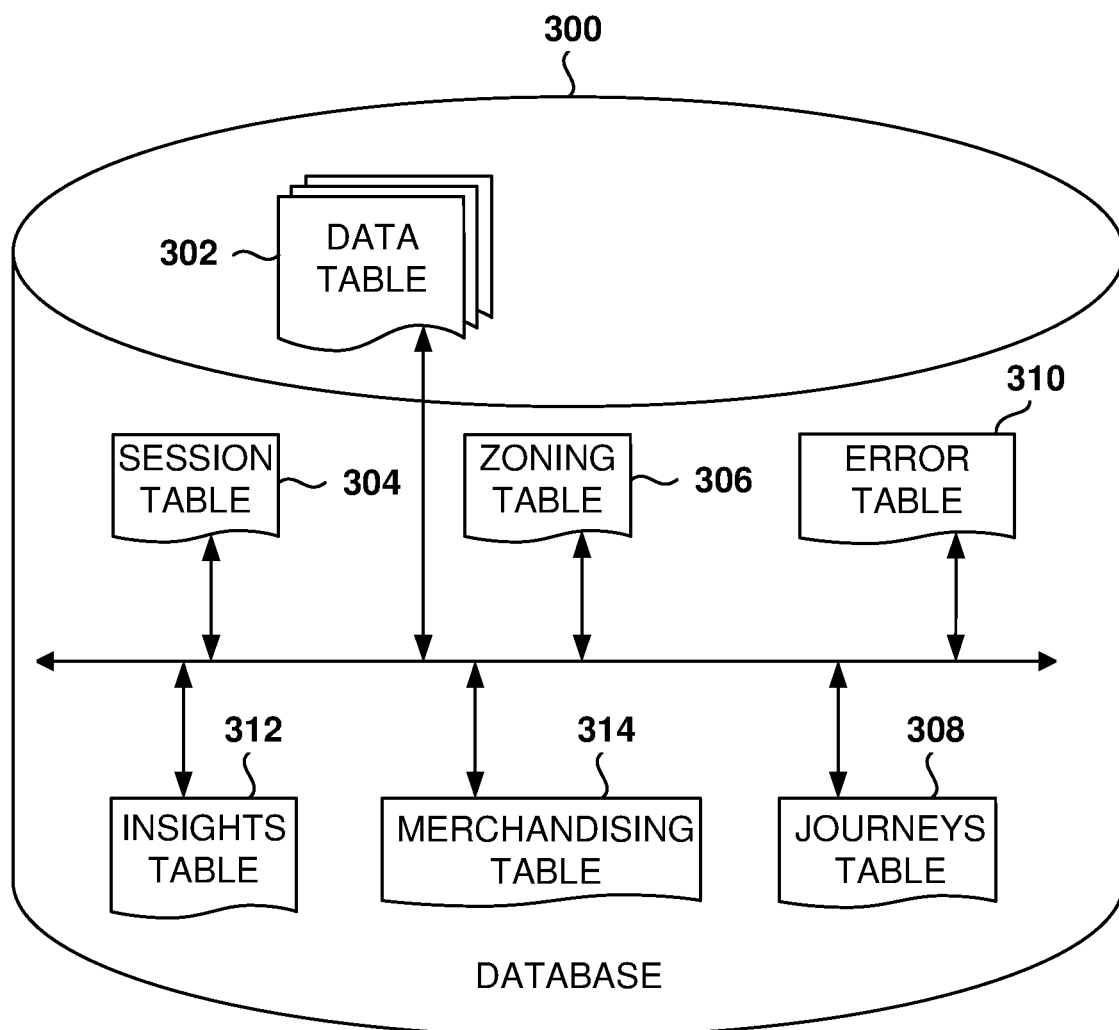
FIG. 3 is a diagrammatic representation of a data structure as maintained in a database, in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

Figure 4:
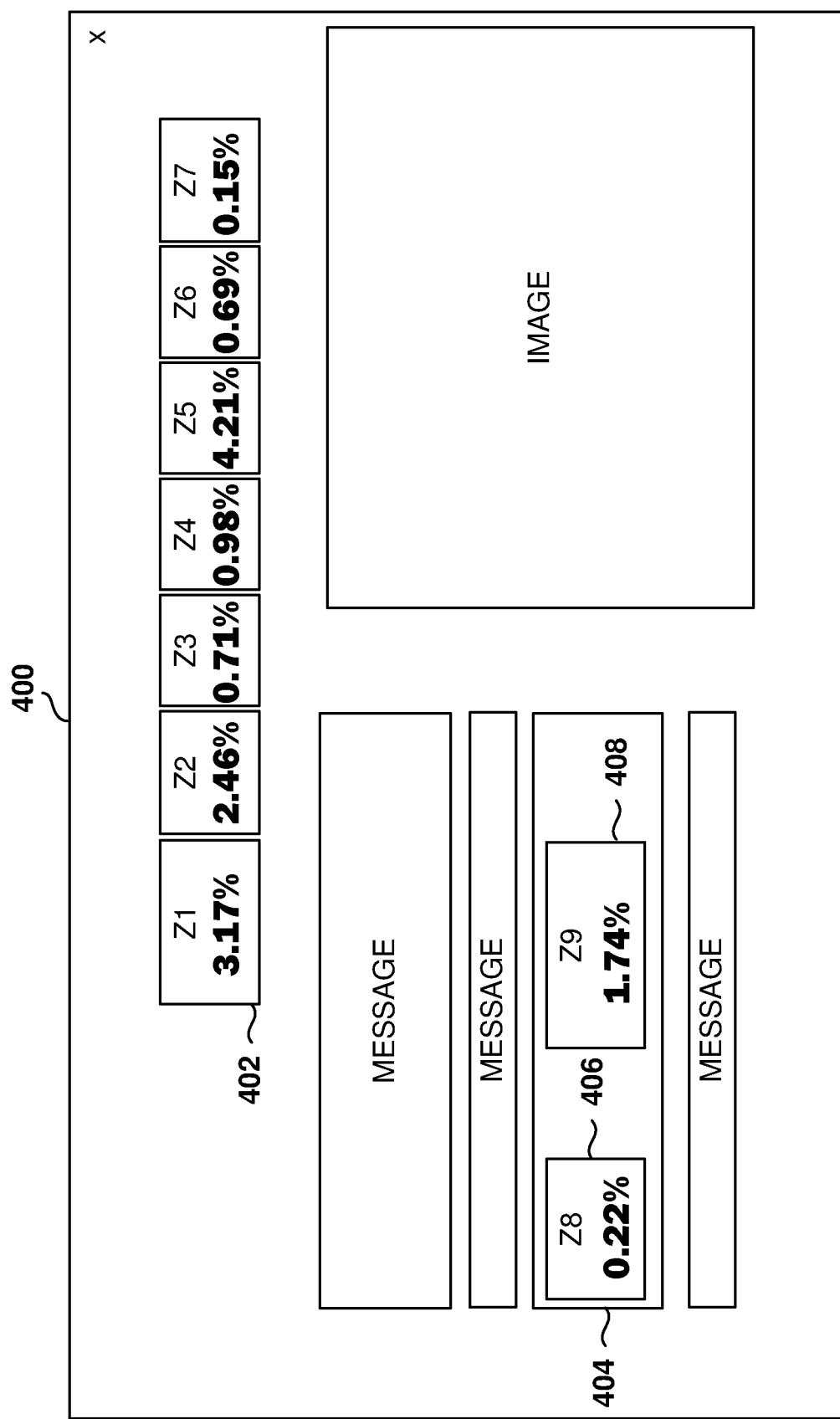
FIG. 4 is a user interface (UI) for presenting a webpage with performance information for zones in the webpage, according to some example embodiments.

FIG. 4 is a user interface (UI) 400 for presenting a webpage with performance information for zones in the webpage, according to some example embodiments. As discussed above, zones refer to the various content elements, fields, and other web components that form the user-facing portions of a webpage or website. As an example, an online shopping website may include a search bar, a "go to cart" button, and a "home page" button, where the search bar and the various buttons are each webpage zones.

Performance metrics refer to various quantifiable factors related to goal achievement. As an example, where a given goal targets a fifteen percent newsletter sign-up rate, a corresponding performance metric may be the percentage of site visitors clicking on a "subscribe to newsletter" button. An example metric of interest is an "average hover time," describing the average amount of time for which users hover the mouse cursor over given elements of the webpage.

With regard to zones (e.g., zone 402, 404, 406, 408), metrics may be overlayed on the zones for an easy way to compare zone metrics. The zone metrics include hover rate, click recurrence, attractiveness rate, exposure rate, and exposure time, but other metrics may also be included.

The hover rate is an average time spent hovering over the zone. The click recurrence is the average number of clicks on the zone for page views with at least one click on the zone. The attractiveness rate is the percentage of page views where the zone was visible on the screen with at least one click on the zone.

In the illustrated example in FIG. 4, the click recurrence for each zone is shown imposed over the zone. For example, zone 402 shows that 2.34% of the users that view the zone click on the zone. Zones may also include other zones within, such as zone 404 that includes zones 406 (click recurrence of 0.22%) and zone 408 (click recurrence of 1.74%).

Figure 5:
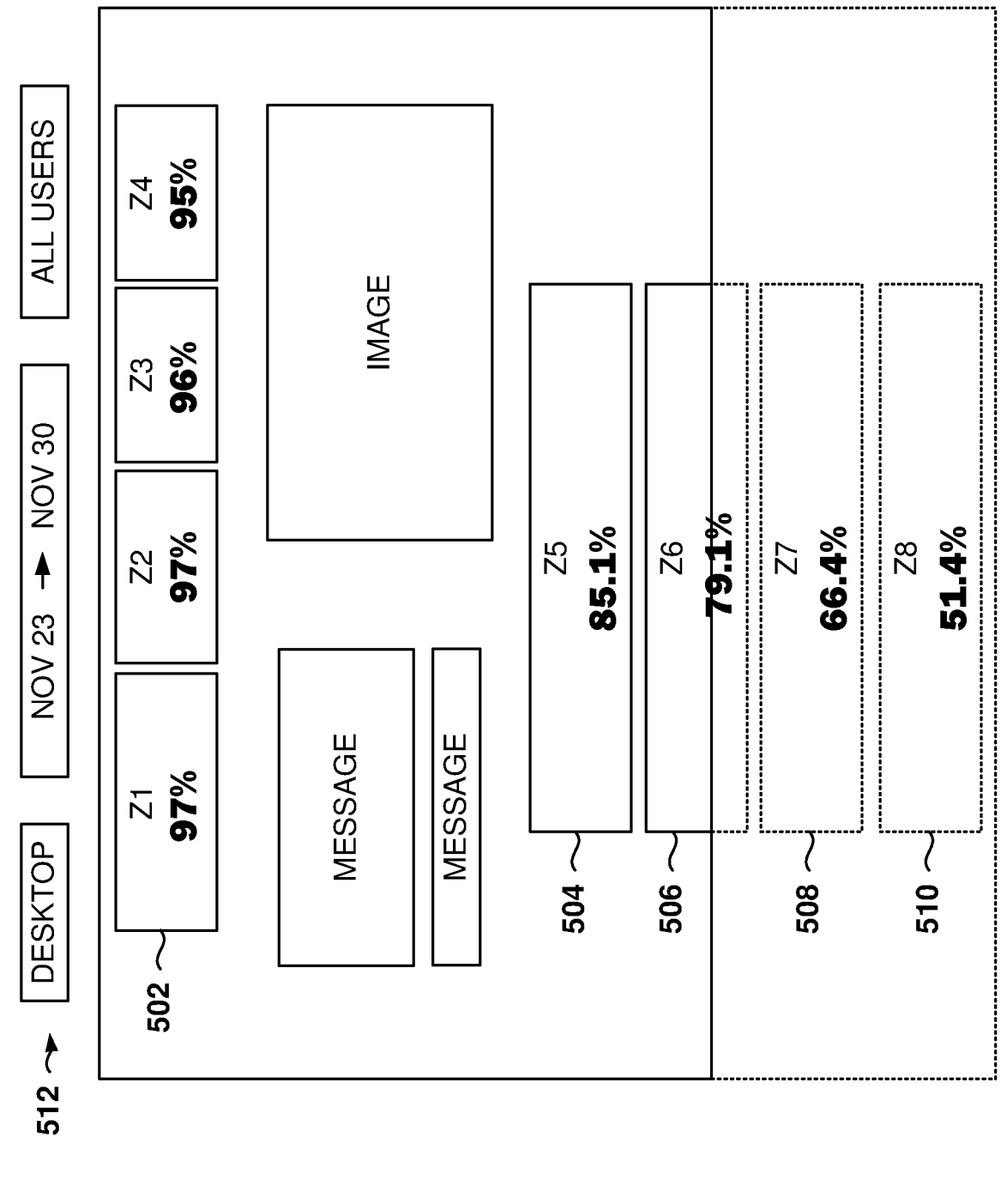
FIG. 5 is a user interface (UI) for presenting the exposure rate of the zones in the webpage, according to some example embodiments.

FIG. 5 is a user interface (UI) 500 for presenting the exposure rate of the zones in the webpage, according to some example embodiments. The exposure rate is the number for webpage views that expose at least a predetermined fraction of the zone for a predefined amount of time divided by the total number of webpage views. In some example embodiments, the predetermined fraction is referred to as minimum vertical visibility of the zone. Vertical visibility is the distance (measured in pixels) from the top of the zone to the lowest part of the zone that was visible divided by the vertical size of the zone. In some embodiments, a vertical visibility of 50% is configured for counting the zone as viewed, that is, the mid-point of the zone was visible, but other embodiments may use other vertical visibility numbers, such as 5%, 10%, 25%, 60%, or any value in the range from 1% to 100%. The vertical visibility threshold may be configured by the user. The exposure rate may also be defined as the number for webpage views that expose the visibility line of the zone for a predefined amount of time divided by the total number of webpage views.

Another reason for unexpected exposure rates is due to the existence of several versions of the same webpage, where sometimes one or more zones may not be displayed (e.g., for members accessing on a small display such as the one of a mobile phone).

Further, the predefined amount of time required for considering that the zone was viewed is configurable. For example, the predefined amount of time is 150 ms in one embodiment, but other embodiments may use other amounts of time, such as periods in the range from 25 ms to five seconds or more. The purpose of setting a time threshold is to avoid counting views when the user is scrolling very fast down the page, e.g., to get to the links provided at the bottom of the page, so if a user is scrolling very far through a zone, this would not count as a zone view for calculating the exposure rate. The exposure rate is an indication on how far the members are scrolling down the webpage.

In some example embodiments, the whole width of the zone is used to determine that the zone has been viewed. In other embodiments, a horizontal visibility parameter is defined, similar to the vertical visibility, which is the distance (measured in pixels) from the leftmost pixel of the zone to the rightmost pixel of the zone that was visible divided by the horizontal size of the zone. Different embodiments may use different minimum horizontal visibility, such as 50% (half the zone is visible horizontally), 80%, 100% (the complete zone is visible), etc.

The exposure rate allows the client to identify undesired behaviors. For example, an unexpected drop in the exposure can indicate that members did not go down the page as far as desired. The client may then take action to correct the low exposure rate, such as by changing the layout of the webpage and promoting a particular zone.

The exposure time is the average time with at least half of the zone visible on the screen and indicates how long the zone is visible, but other vertical visibility numbers may also be applied for calculating the exposure time.

Typically, as the location of a zone is further down the webpage, the exposure rate decreases, since usually the clients start viewing at the top of the page, although sometimes a link with a bookmark on the webpage may be used to access directly that part of the page without having to start from the top. This is why some of the zones on the top may not have 100% exposure rate.

In the illustrated example, the zones toward the top have higher exposure rates, such as zone 502 with an exposure rate of 97%, zone Z2, zone Z3, etc., and the exposure rate decreases with the zones down the page, such as 85.1% for zone Z5 504, 79.1% for zone Z6 506, 66.4% for zone Z7 508, and 51.4% for zone Z8 510. In this example, zone Z4 has a lower exposure rate (95%) than zone Z1 (97%) because the zone Z4 may not be displayed sometimes on a narrow display.

The top of the page shows the search parameters 512 that provide the context for calculating the exposure rate, and the search parameters 512 include device type (e.g., desktop), range of dates for the webpage views, and filtering of users (e.g., all users).

Figure 6:
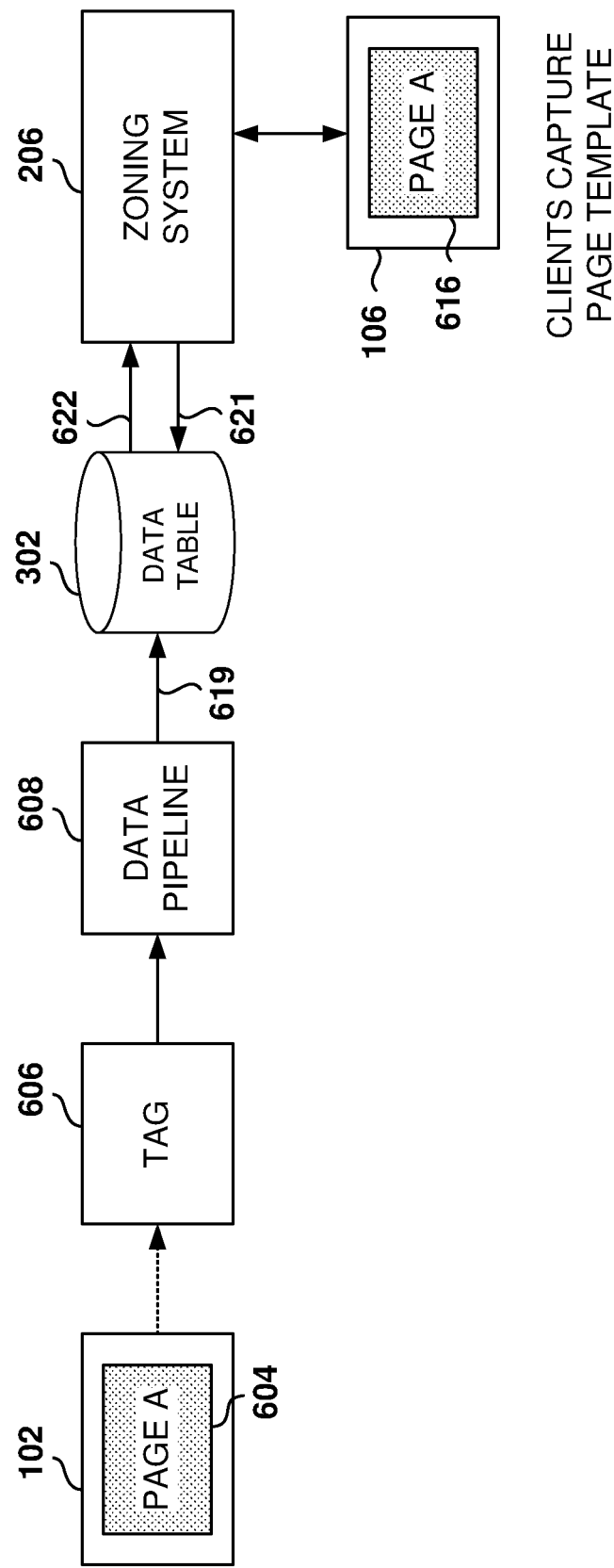
FIG. 6 illustrates a simplified architecture for calculating exposure rate, according to some example embodiments.

FIG. 6 illustrates a simplified architecture for calculating exposure rate, according to some example embodiments. When a member accesses a webpage on the member device, the system tags 606 the view and collects information regarding the webpage view, the information including the webpage view count, the window size (height and width measured in pixels), the webpage size (webpage height and width measured in pixels), the scroll position of the view (e.g., top and bottom boundaries measured in pixels from the top of the page, and the duration of the view (e.g., measured in milliseconds).

The collected information is sent to the data pipeline 608 and stored 619 in the data table 302. The data pipeline 608 creates a session ID and a viewport 604, which is the part of the webpage visible during the view of the webpage. The viewport 604 is defined as the portion of the webpage presented on the UI of the member or the client. The information for the viewport 604 includes the coordinates of, at least, the top left corner and the bottom right corner of the pixels shown on the UI, the position of the top, bottom, left, and right parts of the view within the webpage (e.g., measured in pixels), and the duration of the view (e.g., in ms), which is also referred to as the exposition or exposure time. The data pipeline 608 then stores the view information in the data table 302. In some embodiments, only coordinates of two or more corners are stored, but other embodiments may store the locations of the different sides of the viewport.

The client device 106 interacts with the zoning system 206 to obtain information about the zones, e.g., to obtain the exposure rate as described with reference to FIG. 5. The client device 106 captures a viewport 616 of the webpage using the client device 106 browser and screen resolution. That is, the shape and size of the viewport 604 depends on the device and browser used by the client, and this shape and size of the viewport 604 will affect the calculations for the location of the zones in the webpage A.

When the client wants to see the exposure rate for zones in the webpage, the zone system sends a request 621 to the data table 302 to get the webpage views that contain the viewport 616, and the requests provides the information about the viewport 616, including dimensions and location.

The zoning system 206 obtains 622 the webpage view data from the data table 302 and calculates the exposure rate. The exposure rate is then presented on the client device 106.

Figure 7:
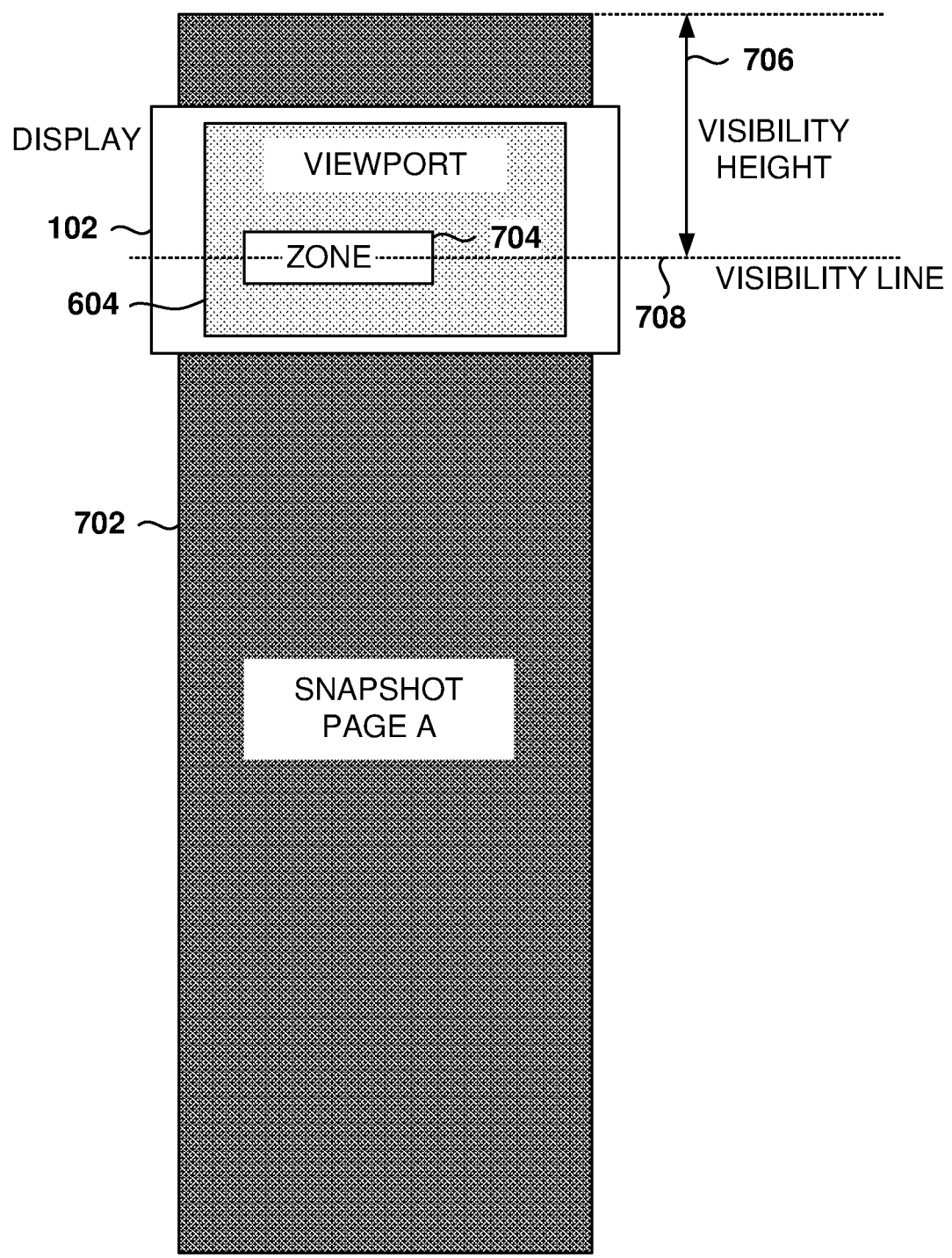
FIG. 7 illustrates the determination of the visibility height of a zone, according to some example embodiments.

FIG. 7 illustrates the determination of the visibility height 706 of a zone, according to some example embodiments. A snapshot 702 of a webpage includes the captured view of the webpage. The viewport 604 shows the part of the snapshot 702 that was visible on the display of the member client device 102.

A zone 704 is captured inside the viewport 604. A visibility line 708 is a line within the zone 704 that determines when the zone 704 has been viewed by a member. That is, the zone 704 is considered viewed in a snapshot of the webpage when the visibility line 708 is presented on the UI of the client or the member.

The visibility height 706 for a zone 704 is a distance in pixels from the top of the webpage to the visibility line 708. Thus, the visibility height 706 determines that a zone has been viewed by a member when a snapshot of the webpage presented to the member includes the line of the webpage at the distance associated with the visibility height.

The visibility height 706 depends on the minimum vertical visibility required to consider the webpage viewed in the snapshot. Thus, the visibility height 706 is equal to the distance from the top of the zone to the top of the page plus the vertical size of the zone times the minimum vertical visibility required.

For example, for a mid-pixel zone visibility where the top half of the zone has to be presented to consider the zone viewed (a vertical visibility of 50%), the visibility height 706 will be equal to the distance from the vertical middle of the zone to the top of the webpage.

In this example, the middle of the zone is used for calculating the exposure rate, but other embodiments may use other visibility heights for calculating visibility as derived from the vertical visibility parameter for determining when the zone is viewed.

Similarly, horizontal visibility may be configurable to require a minimum amount of the zone exposed when measured from the left of the zone, but in the illustrated example, it is assumed that the complete width of the zone has to be visible to be considered an exposure of the zone. Other embodiments may utilize different horizontal visibility values.

In previous solutions, the visibility height 706 was calculated when the client made a request, so the location of the zone 704 depends on the viewport of the client making the request. This generated inconsistent values of the exposure rate when different clients make the request for the exposure rate using different viewport sizes.

In some example embodiments, the visibility height 706 is calculated the first time the client requests the exposure rate for the given parameters of the snapshot (e.g., date range), and then stored in a database. Future requests for the same snapshot with the same parameters will use the stored value of the visibility height 706 instead of calculating it each time. As a result, the exposure rate will be the same in the first and all future requests for the zone exposure rate (for the given set of parameters such as date range).

It is noted that if a zone is rather large, the complete zone may not be visible at one point in time, so the exposure rate may be zero. This problem may be avoided by adjusting the value of the vertical visibility for all the zones, or by adjusting the requirement for vertical visibility only for large vertical zones, e.g., those exceeding a predetermined vertical pixel size. For these large vertical zones, the vertical visibility may be adjusted by a certain percentage, such as 90%, 50%, 25%, etc. Thus, if the vertical visibility is defined at 50%, for a large zone, the vertical visibility could be adjusted to 25% (50%×50%), so the exposure rate of the large vertical zone would not be zero.

Figure 8:
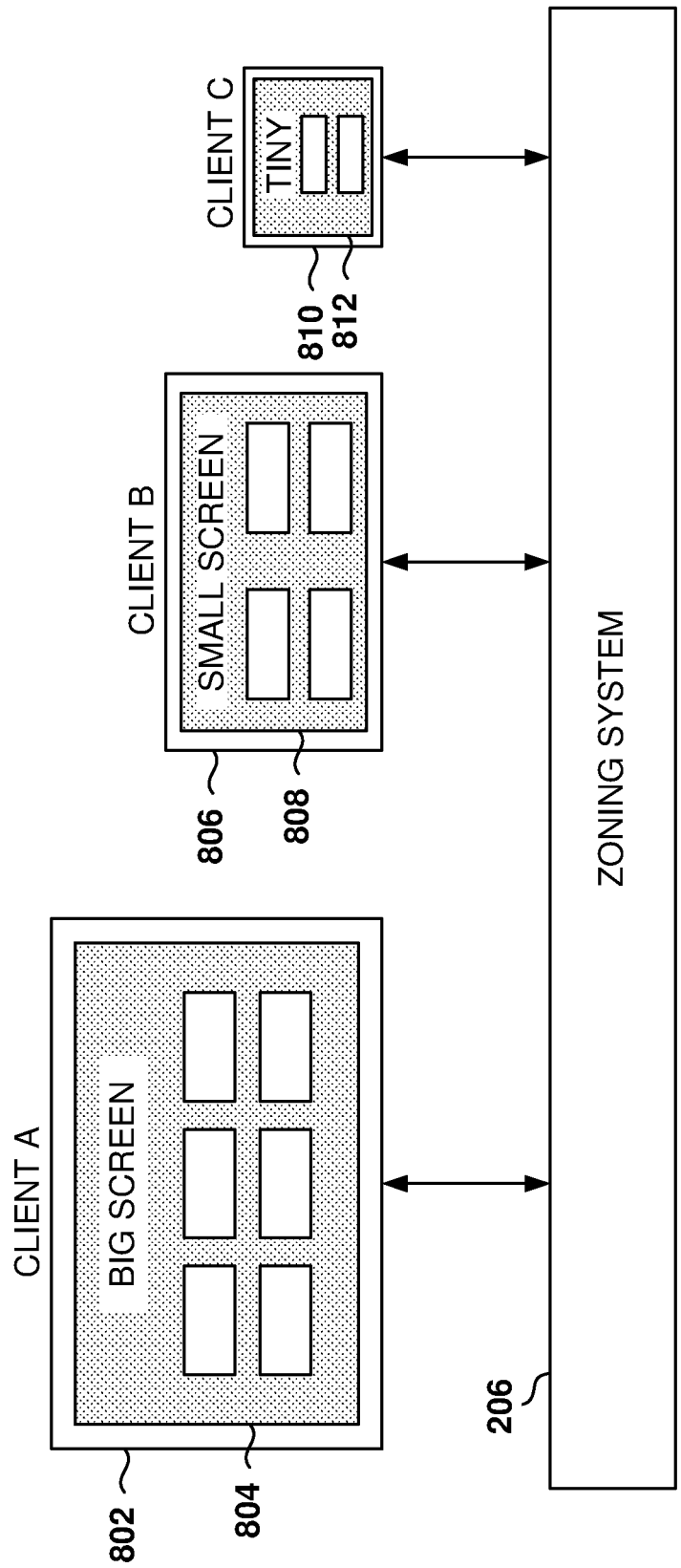
FIG. 8 illustrates how the same webpage may be presented in different layouts based on the member device, according to some example embodiments.

FIG. 8 illustrates how the same webpage may be presented in different layouts based on the member device, according to some example embodiments. The same webpage may have different layouts based on the size of the display used by the client.

For example, client A uses a big display 802, which results in a big viewport 804, and in the illustrated example, the viewport 804 includes six zones. Client B uses a small display 806, which results in a smaller viewport 808, and the viewport 808 includes four zones. Client C uses a small display 810 (referred to as "tiny display") such as the one used in a mobile phone, which results in an even smaller viewport 812 showing two zones.

Thus, the exposure rate calculated by the zoning system 206 will depend on the viewport configuration selected for making the calculations of the zones' locations, which will affect the exposure rate calculations. It is noted that when the members browse the webpage, their views will also change based on their display, but, in some embodiments, the calculation of the exposure rate is based on how far (in pixels) the user scrolls down the page, without taking into consideration the particular layout of the presentation for each member. This approximation enables a faster calculation of the exposure rate. Otherwise, there could be thousands or millions of views, and each view would have a different location in the zones.

Another interesting case is for the presentation of sticky zone on the page, where a sticky zone is a zone that can hover at a certain location independently of the layout of other zones. Sticky zones are dynamically positioned zones, which result in their vertical location on the page to be variable. Since the exposure rate is calculated based on the mid-pixel zone height, the difference between the effective exposure rate and the one displayed is being minimized and the exposure rate tends to be closer to reality.

Figure 9:
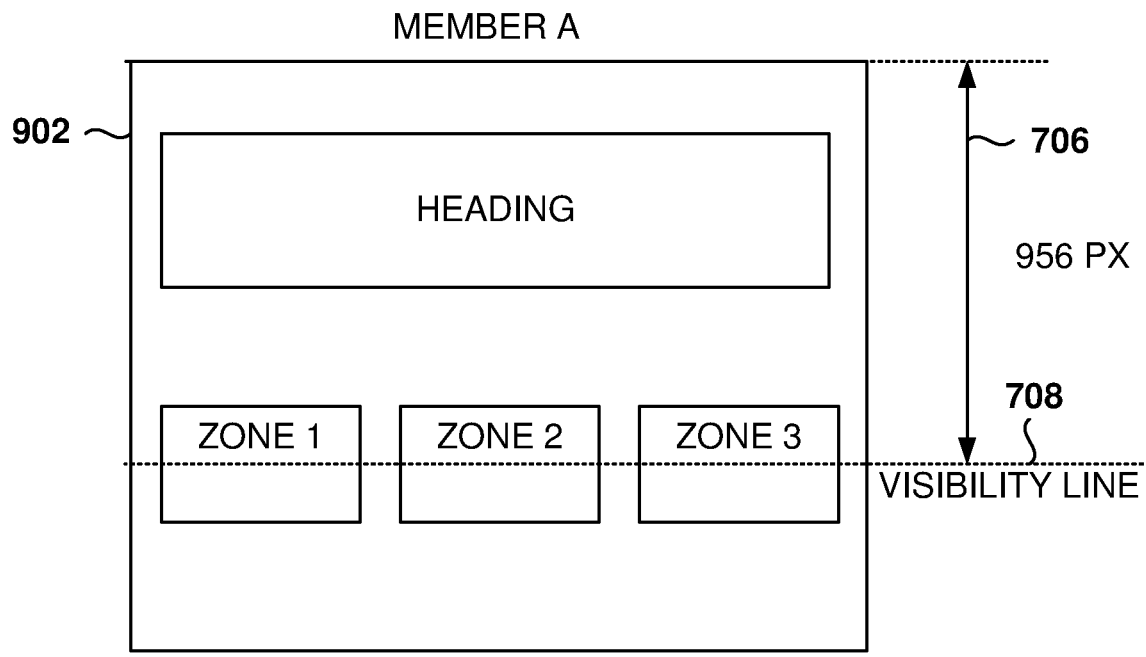
FIG. 9 illustrates how the same layout may have different distances based on user device, according to some example embodiments.
Figure 9:
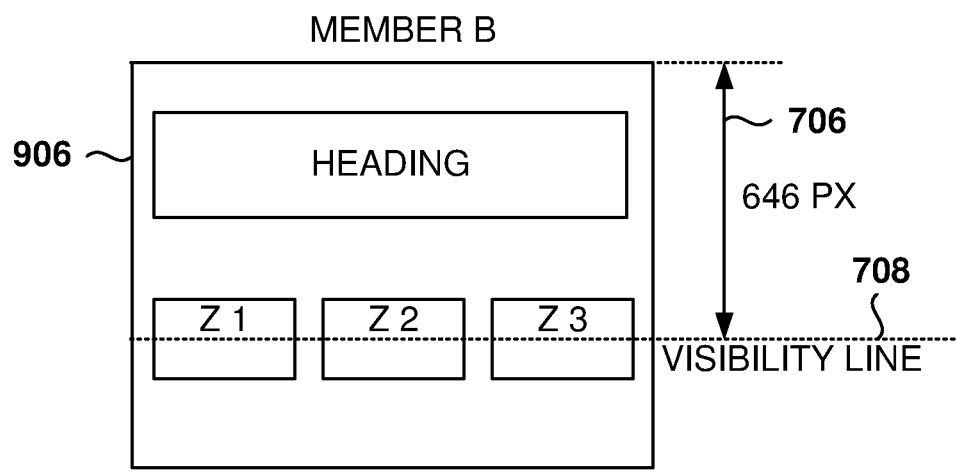

FIG. 9 illustrates how the same layout may have different distances based on user device, according to some example embodiments. Some webpages may always provide the same layout, and the visible portion will depend on how big the display is. However, other webpages change the layout based on the display size. For example, for a big display, the optimum view is provided with large areas for the zones displayed, but for a small display, the zones are compressed, may be also moved, to accommodate the smaller display.

In the illustrated example, member A (display 902) and member B (display 906) are browsing the same webpage, and the display 902 is bigger than the display 906. When calculating the visibility height 706 for Zone 1, different values are obtained for the two displays because the view for display 906 has been compressed to adjust for a smaller display. In the illustrated example, the visibility height 706 for Zone 1 is 956 pixels for display 902 and 646 pixels for display 906.

Thus, this example shows that the exposure rate may vary not just because the viewport size is different, but also because different viewports may be presented with different layouts.

In some example embodiments, as discussed above, a representative visibility height 706 value is obtained based on the value obtained for the display of the member making the first request for the exposure rate.

Figure 10:
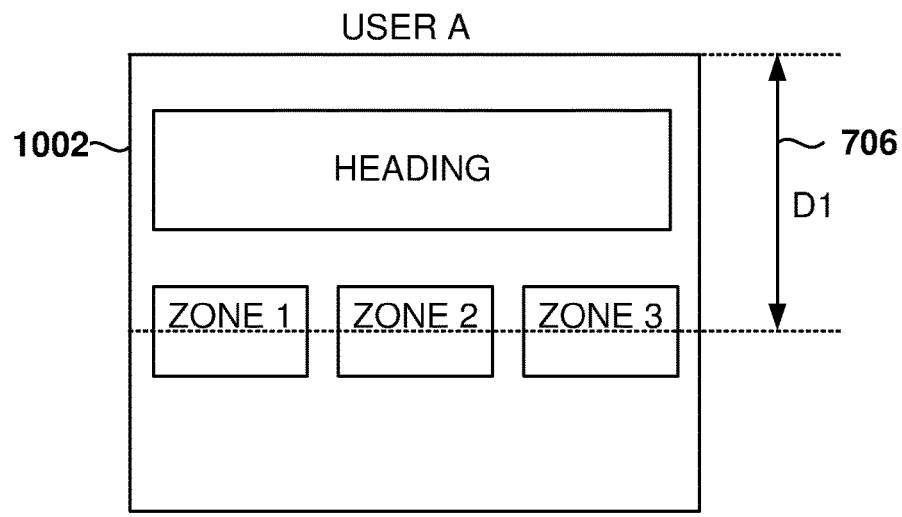
FIG. 10 illustrates how the layout of the webpage may change based on the size of the viewport, according to some example embodiments.
Figure 10:
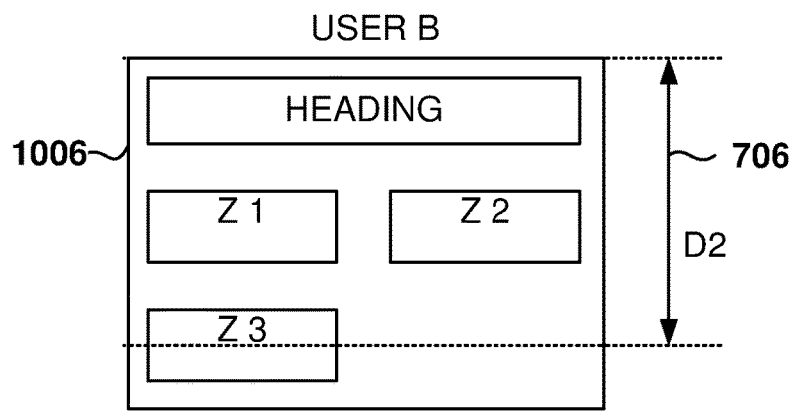
Figure 10:
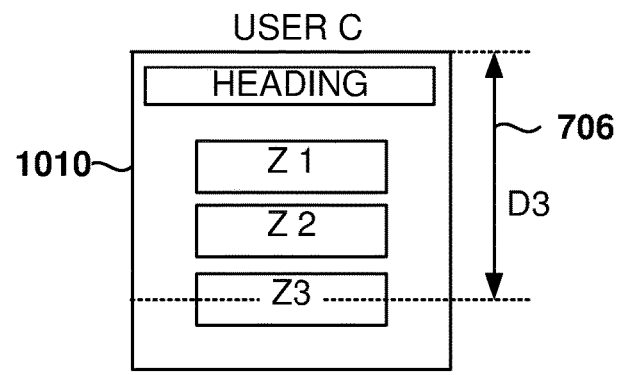

FIG. 10 illustrates how the layout of the webpage may change based on the size of the viewport, according to some example embodiments. In some cases, the website may change the locations of the zones based on the viewport size.

For example, for user A, the UI 1002 will present zones 1-3 at the same mid-pixel zone height D1 706. However, user B has a smaller viewport, so the zone locations are changed in the UI 1006, with zones 1 and 2 at a first level, and zone 3 located below (zone 3 has a mid-pixel zone height D2 706 different from D1).

Further, user C has an even smaller viewport, and the zones are arranged vertically in the UI 1010, with zone 3 below zones 1 and 2. Thus, zone 3 has a mid-pixel zone height D3 706 different from D1 and D2.

Figure 11:
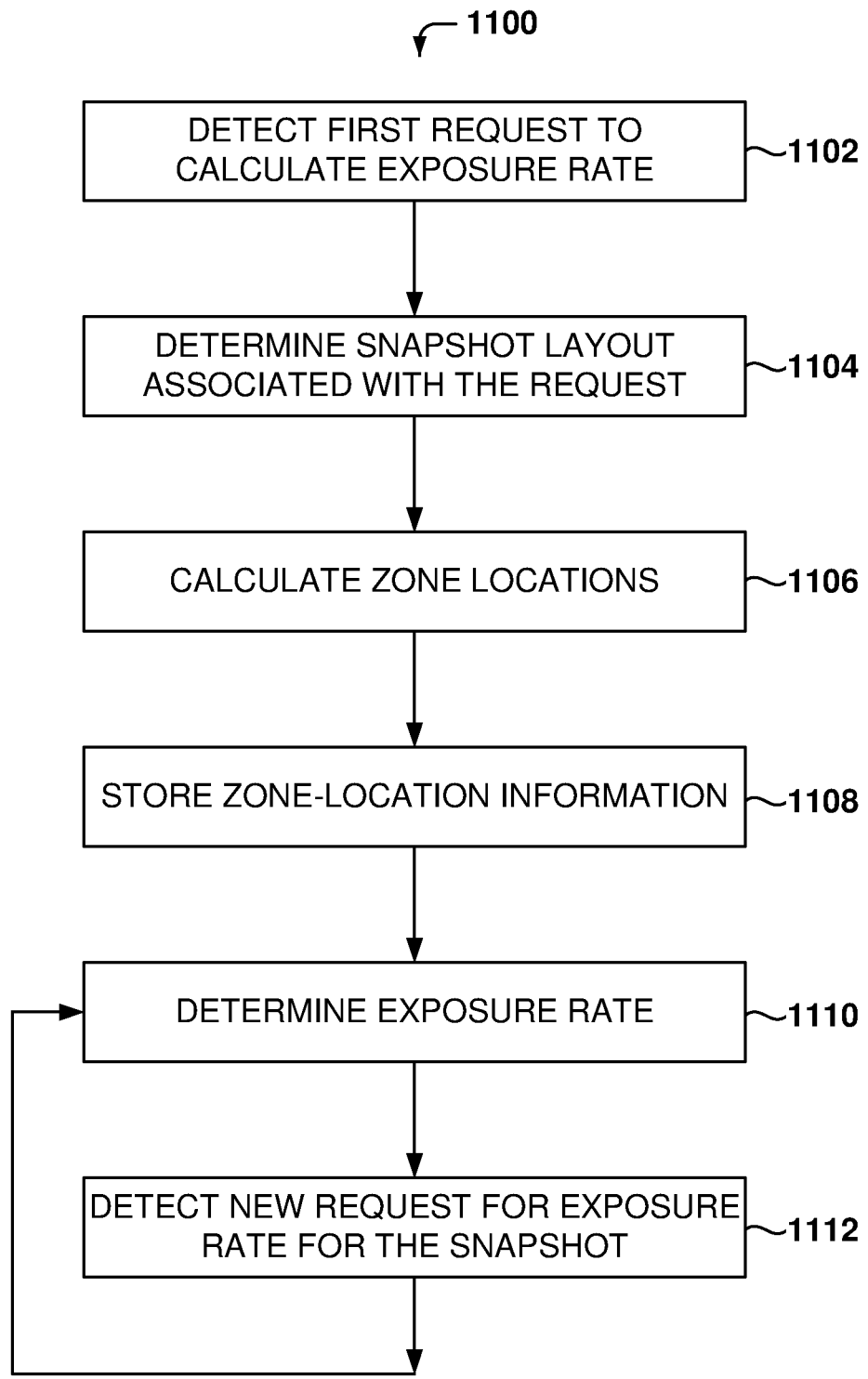
FIG. 11 is a flowchart of a method for determining the exposure rate, according to some example embodiments.

FIG. 11 is a flowchart of a method 1100 for determining the exposure rate, according to some example embodiments. While the various operations in this flowchart are presented and described sequentially, one of ordinary skill will appreciate that some or all of the operations may be executed in a different order, be combined or omitted, or be executed in parallel.

In some embodiments, the visibility height 706 value used is stored when the zone is created, that is, the first time the client requests metrics for the zone for a given webpage, for a defined range of dates. This way, clients that request the exposure rate metric for the same zone, with the same parameters, will obtain the same value, even if the clients making the request have a different viewport. This way, the viewport (e.g., display size, screen resolution) does not affect the visibility height 706. The clients will see the same value of exposure rate for a given zone, regardless of the size of their screen or of the position of the element in the location of the zones in their viewport.

Prior approaches calculated the visibility height 706 for every requesting client, which resulted in some discrepancies at times due to the viewport of the requester.

At operation 1102, a first request for calculating the exposure rate of one or more zones is detected. The request includes information about the viewport of the requesting user.

From operation 1102, the method 1100 flows to operation 1104 for determining a snapshot layout associated with the request; that is, the locations of the zones are determined based on the viewport of the requesting user.

From operation 1104, the method 1100 flows to operation 1106 where the zones' locations are calculated, such as coordinates within the webpage of the top of the zone, the bottom of the zone, and the corresponding location of the visibility height that determines visibility for the zone (e.g., distance in pixels from the top of the webpage). For example, if the vertical visibility factor is 50%, then the midpoint of the zones are calculated to determine visibility by a visiting member.

At operation 1108, the calculated zone locations are stored, or at least some part of the information, such as the visibility height. From operation 1108, the method 1100 flows to operation 1110 where the exposure rate is calculated based on the recorded sessions of visiting members and the locations of the zone calculated at operation 1106.

From operation 1110, the method 1100 flows to operation 1112, where a new request for exposure rate is detected. In this case, the method 1100 flows back to operation 1110 to determine the exposure rate. That is, the zone-location information is not recalculated based on the viewport of the client submitting the new request.

Figure 12:
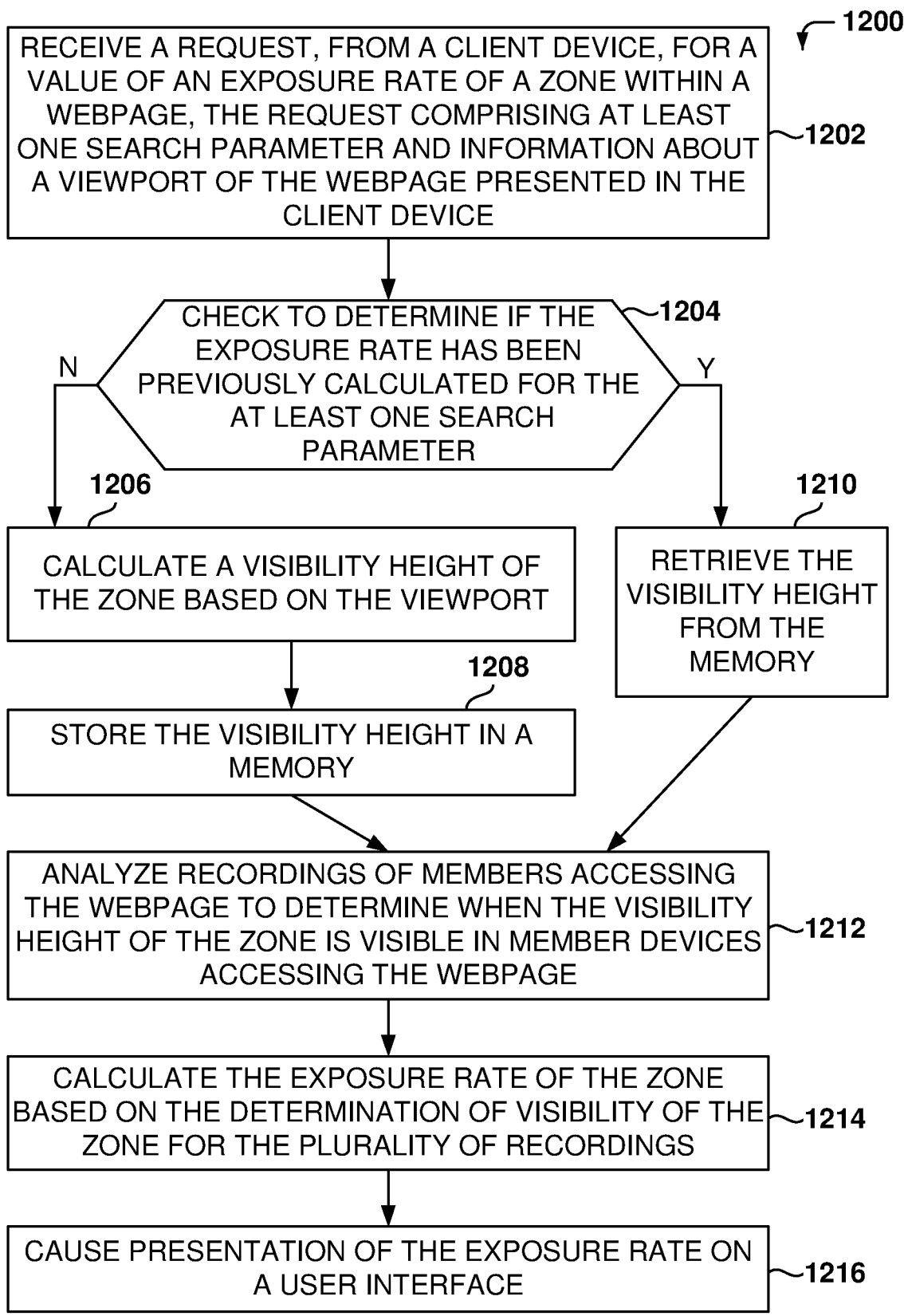
FIG. 12 is a flowchart of a method for determining the exposure rate consistently for multiple users, according to some example embodiments.

FIG. 12 is a flowchart of a method 1200 for determining the exposure rate consistently for multiple users, according to some example embodiments. While the various operations in this flowchart are presented and described sequentially, one of ordinary skill will appreciate that some or all of the operations may be executed in a different order, be combined or omitted, or be executed in parallel.

Operation 1202 is for receiving a request, from a client device, for a value of an exposure rate of a zone within a webpage. The request comprises at least one search parameter and information about a viewport of the webpage presented in the client device.

From operation 1202, the method 1200 flows to operation 1204 for checking to determine if the exposure rate has been previously calculated for the at least one search parameter.

When the exposure rate has not been previously calculated, the method 1200 flows to operation 1206, and when the exposure rate has been calculated the method 1200 flows to operation 1210.

At operation 1206, the method 1200 calculates a visibility height of the zone based on the viewport. From operation 1206, the method 1200 flows to operation 1208 for storing the visibility height in a memory.

At operation 1210, the visibility height is retrieved from the memory.

From operations 1208 and 1210, the method 1200 flows to operation 1212 for analyzing a plurality of recordings of members accessing the webpage to determine when the visibility height of the zone is visible in member devices accessing the webpage.

From operation 1212, the method 1200 flows to operation 1214 to calculate the exposure rate of the zone based on the determination of visibility of the zone for the plurality of recordings.

From operation 1214, the method 1200 flows to operation 1216 for causing presentation of the exposure rate on a user interface (UI).

In one example, a visibility line of the zone is a horizontal line within the zone 704 that determines when the zone 704 is considered viewed by the member, and the visibility height for the zone is a distance in pixels from a top of the webpage to the visibility line.

In one example, the vertical visibility of the zone is a distance from a top of the zone to the lowest part of the zone that was visible divided by the vertical size of the zone, and the visibility height is equal to a distance from the top of the zone to the top of the webpage plus a vertical size of the zone times a minimum vertical visibility required to consider the webpage visible.

In one example, the exposure rate is a number of webpage views that expose the visibility height of the zone for a predefined amount of time divided by a total number of webpage views.

In one example, calculating the visibility height of the zone comprises determining a location of the zone based on the viewport of the webpage presented in the client device, and calculating the visibility height based on the determined location of the zone.

In one example, the at least one search parameter comprises an identification of the webpage and a date range.

In one example, analyzing a plurality of recordings comprises, for each recording, determining if the webpage at the visibility height was presented to the member, and calculating that the zone was exposed in the recording based on the determination.

In one example, each recording from the plurality of recordings includes at least one from data of changes in a user interface of the webpage being displayed on the client device, elements on the webpage being displayed on the user interface, text inputs into the webpage, or mouse clicks on the user interface.

Another general aspect is for a system that includes a memory comprising instructions and one or more computer processors. The instructions, when executed by the one or more computer processors, cause the one or more computer processors to perform operations comprising: receiving a request, from a client device, for a value of an exposure rate of a zone within a webpage, the request comprising at least one search parameter and information about a viewport of the webpage presented in the client device; checking to determine if the exposure rate has been previously calculated for the at least one search parameter; when the exposure rate has not been previously calculated: calculating a visibility height of the zone based on the viewport and storing the visibility height in a memory; when the exposure rate has been calculated, retrieving the visibility height from the memory; analyzing a plurality of recordings of members accessing the webpage to determine when the visibility height of the zone is visible in member devices accessing the webpage; calculating the exposure rate of the zone based on the determination of visibility of the zone for the plurality of recordings; and causing presentation of the exposure rate on a user interface (UI).

In yet another general aspect, a machine-readable storage medium (e.g., a non-transitory storage medium) includes instructions that, when executed by a machine, cause the machine to perform operations comprising: receiving a request, from a client device, for a value of an exposure rate of a zone within a webpage, the request comprising at least one search parameter and information about a viewport of the webpage presented in the client device; checking to determine if the exposure rate has been previously calculated for the at least one search parameter; when the exposure rate has not been previously calculated: calculating a visibility height of the zone based on the viewport and storing the visibility height in a memory; when the exposure rate has been calculated, retrieving the visibility height from the memory; analyzing a plurality of recordings of members accessing the webpage to determine when the visibility height of the zone is visible in member devices accessing the webpage; calculating the exposure rate of the zone based on the determination of visibility of the zone for the plurality of recordings; and causing presentation of the exposure rate on a user interface (UI).

In view of the disclosure above, various examples are set forth below. It should be noted that one or more features of an example, taken in isolation or combination, should be considered within the disclosure of this application.

Figure 13:
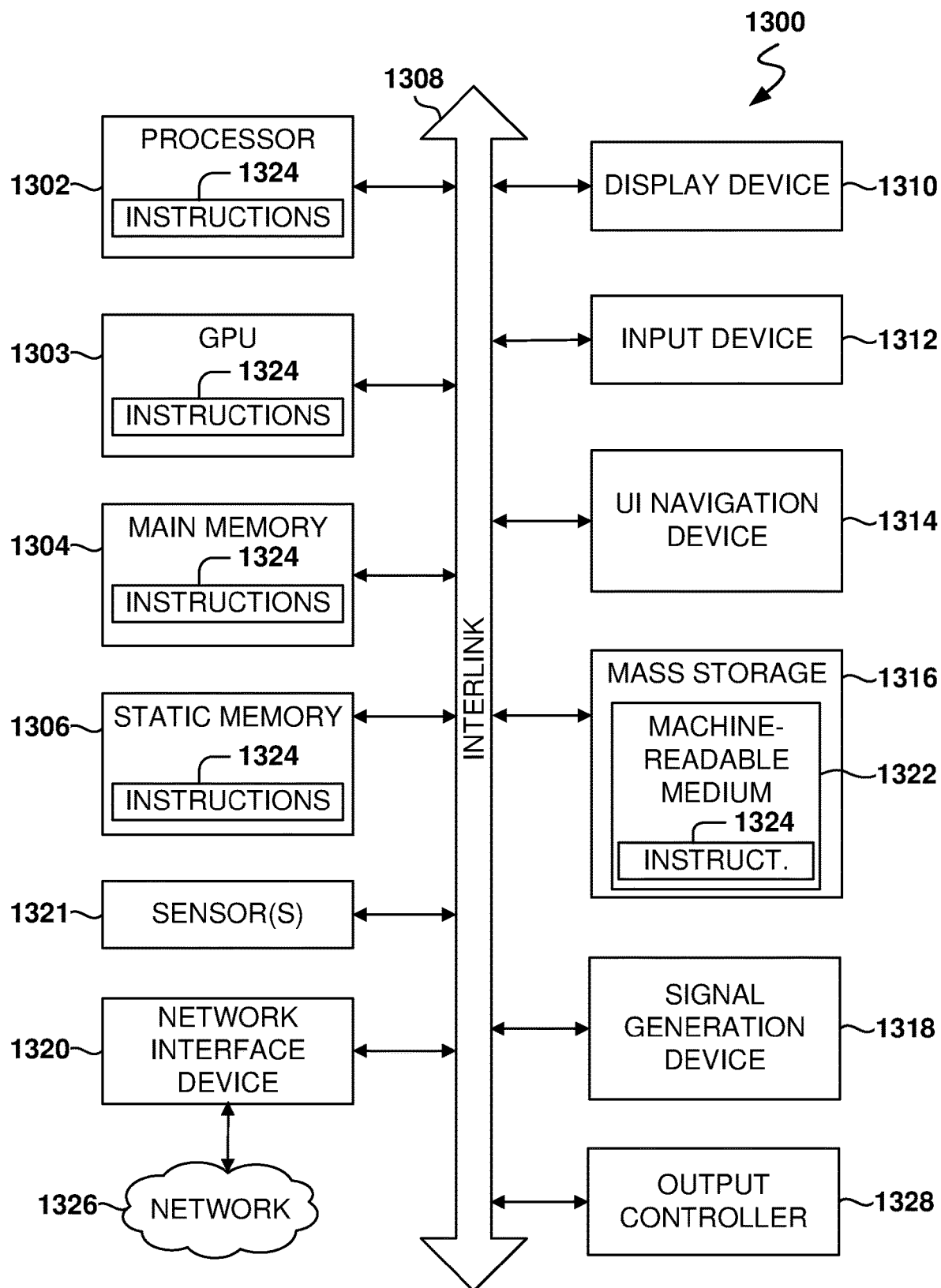
FIG. 13 is a block diagram illustrating an example of a machine upon or by which one or more example process embodiments described herein may be implemented or controlled.

FIG. 13 is a block diagram illustrating an example of a machine 1300 upon or by which one or more example process embodiments described herein may be implemented or controlled. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in a peer-to-peer (P2P) (or other distributed) network environment. Further, while only a single machine 1300 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1300 may include a hardware processor 1302 (e.g., a central processing unit (CPU), a hardware processor core, or any combination thereof), a graphics processing unit (GPU) 1303, a main memory 1304, and a static memory 1306, some or all of which may communicate with each other via an interlink (e.g., bus) 1308. The machine 1300 may further include a display device 1310, an alphanumeric input device 1312 (e.g., a keyboard), and a user interface (UI) navigation device 1314 (e.g., a mouse). In an example, the display device 1310, alphanumeric input device 1312, and UI navigation device 1314 may be a touch screen display. The machine 1300 may additionally include a mass storage device (e.g., drive unit) 1316, a signal generation device 1318 (e.g., a speaker), a network interface device 1320, and one or more sensors 1321, such as a Global Positioning System (GPS) sensor, compass, accelerometer, or another sensor. The machine 1300 may include an output controller 1328, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1316 may include a machine-readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within the static memory 1306, within the hardware processor 1302, or within the GPU 1303 during execution thereof by the machine 1300. In an example, one or any combination of the hardware processor 1302, the GPU 1303, the main memory 1304, the static memory 1306, or the mass storage device 1316 may constitute machine-readable media.

While the machine-readable medium 1322 is illustrated as a single medium, the term "machine-readable medium" may include a single medium, or multiple media, (e.g., a centralized or distributed database, and/or associated caches and servers) configured to store the one or more instructions 1324.

The term "machine-readable medium" may include any medium that is capable of storing, encoding, or carrying instructions 1324 for execution by the machine 1300 and that cause the machine 1300 to perform any one or more of the techniques of the present disclosure, or that is capable of storing, encoding, or carrying data structures used by or associated with such instructions 1324. Non-limiting machine-readable medium examples may include solid-state memories, and optical and magnetic media. In an example, a massed machine-readable medium comprises a machine-readable medium 1322 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device 1320.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   receiving, by one or more processors, a request from a client device for a value of an exposure rate of a zone within a webpage;
   calculating a visibility height for the zone based on a location of the zone in the webpage when the webpage is presented in a display of the client device, the visibility height for the zone being a distance in pixels from a top of the webpage to a visibility line of the zone in the display;
   analyzing, by the one or more processors, a plurality of recordings of members accessing the webpage to determine when the visibility height of the zone is visible in member devices accessing the webpage, wherein a distance from the visibility line of the zone to the top of the webpage in each recording is based on a display size of the display accessing the webpage, wherein a first recording and a second recording from the plurality of recordings have different visibility lines;
   calculating, by the one or more processors, the exposure rate of the zone based on the determination of when the zone is visible for each of the plurality of recordings; and
   causing presentation of the exposure rate on a user interface (UI) of the client device.

2. The method as recited in claim 1, wherein the visibility height of the zone is a horizontal line in a middle of the zone in a vertical direction.

3. The method as recited in claim 1, wherein the exposure rate is a number of webpage views in the recordings that expose the visibility line of the zone for a predefined amount of time divided by a total number of webpage views.

4. The method as recited in claim 1, wherein the zone is considered viewed when the visibility line is shown in the member device.

5. The method as recited in claim 1, wherein a website presenting the webpage changes locations of the zones presented to members based on a viewport size of each member.

6. The method as recited in claim 1, wherein the first recording has a first presentation and the second recording has a second presentation where presentation of the zone has been compressed, with reference to the first presentation, to adjust for a smaller display associated with the second recording.

7. The method as recited in claim 1, wherein calculating the visibility height of the zone comprises:
   determining a location of the zone based on a viewport of the webpage presented in the client device; and
   calculating the visibility height based on the determined location of the zone.

8. The method as recited in claim 1, wherein the visibility height varies based on a viewport size of the webpage on the client device and based on a layout selected by a website to present the zone.

9. The method as recited in claim 1, further comprising:
   receiving a new request for the exposure rate from a different client device from the client device; and
   utilizing the calculated visibility height to determine the exposure rate.

10. A system comprising:
a memory comprising instructions; and
one or more computer processors, wherein the instructions, when executed by the one or more computer processors, cause the system to perform operations comprising:
  receiving, by one or more processors, a request from a client device for a value of an exposure rate of a zone within a webpage;
  calculating a visibility height for the zone based on a location of the zone in the webpage when the webpage is presented in a display of the client device, the visibility height for the zone being a distance in pixels from a top of the webpage to a visibility line of the zone in the display;
  analyzing, by the one or more processors, a plurality of recordings of members accessing the webpage to determine when the visibility height of the zone is visible in member devices accessing the webpage, wherein a distance from the visibility line of the zone to the top of the webpage in each recording is based on a display size of the display accessing the webpage, wherein a first recording and a second recording from the plurality of recordings have different visibility lines;
  calculating, by the one or more processors, the exposure rate of the zone based on the determination of when the zone is visible for each of the plurality of recordings; and
  causing presentation of the exposure rate on a user interface (UI) of the client device.

11. The system as recited in claim 10, wherein the visibility height of the zone is a horizontal line in a middle of the zone in a vertical direction.

12. The system as recited in claim 10, wherein the exposure rate is a number of webpage views in the recordings that expose the visibility line of the zone for a predefined amount of time divided by a total number of webpage views.

13. The system as recited in claim 10, wherein the zone is considered viewed when the visibility line is shown in the member device.

14. The system as recited in claim 10, wherein a website presenting the webpage changes locations of the zones presented to members based on a viewport size of each member.

15. The system as recited in claim 10, wherein the first recording has a first presentation and the second recording has a second presentation where presentation of the zone has been compressed, with reference to the first presentation, to adjust for a smaller display associated with the second recording.

16. A non-transitory machine-readable storage medium including instructions that, when executed by a machine, cause the machine to perform operations comprising:
  receiving, by one or more processors, a request from a client device for a value of an exposure rate of a zone within a webpage;
  calculating a visibility height for the zone based on a location of the zone in the webpage when the webpage is presented in a display of the client device, the visibility height for the zone being a distance in pixels from a top of the webpage to a visibility line of the zone in the display;
  analyzing, by the one or more processors, a plurality of recordings of members accessing the webpage to determine when the visibility height of the zone is visible in member devices accessing the webpage, wherein a distance from the visibility line of the zone to the top of the webpage in each recording is based on a display size of the display accessing the webpage, wherein a first recording and a second recording from the plurality of recordings have different visibility lines;
  calculating, by the one or more processors, the exposure rate of the zone based on the determination of when the zone is visible for each of the plurality of recordings; and
  causing presentation of the exposure rate on a user interface (UI) of the client device.

17. The non-transitory machine-readable storage medium as recited in claim 16, wherein the visibility height of the zone is a horizontal line in a middle of the zone in a vertical direction.

18. The non-transitory machine-readable storage medium as recited in claim 16, wherein the exposure rate is a number of webpage views in the recordings that expose the visibility line of the zone for a predefined amount of time divided by a total number of webpage views.

19. The non-transitory machine-readable storage medium as recited in claim 16, wherein the zone is considered viewed when the visibility line is shown in the member device.

20. The non-transitory machine-readable storage medium as recited in claim 16, wherein a website presenting the webpage changes locations of the zones presented to members based on a viewport size of each member.

* * * * *